Oct. 30, 1923.

G. R. SAHLSTROM

VEHICLE SPRING

Filed July 26, 1922

1,472,682

Inventor
Gustav R. Sahlstrom
By Horace C. Handlee
Attorney

Patented Oct. 30, 1923.

1,472,682

UNITED STATES PATENT OFFICE.

GUSTAV R. SAHLSTROM, OF SHERIDAN, WYOMING.

VEHICLE SPRING.

Application filed July 26, 1922. Serial No. 577,675.

*To all whom it may concern:*

Be it known that I, GUSTAV R. SAHLSTROM, a citizen of the United States, residing at Sheridan, in the county of Sheridan, State of Wyoming, have invented certain new and useful Improvements in Vehicle Springs; and I do hereby declare the following to be a full, clear, and exact description of the invention, such as will enable others skilled in the art to which it appertains to make and use the same.

This invention relates to new and useful improvements in springs and particularly to vehicle springs.

One object of the invention is to provide a spring of this character which is arranged to sustain heavy or light loads with equal facility, and wherein the rebound will not damage the spring.

Another object is to provide a spring of this character wherein a portion of the spring is adapted to yield under pressure of a light load without affecting the remainder of the spring, and wherein the light load portion will readily yield before the heavy load portion comes into play.

Other objects and advantages will be apparent from the following description when taken in connection with the accompanying drawing.

Figure 1:
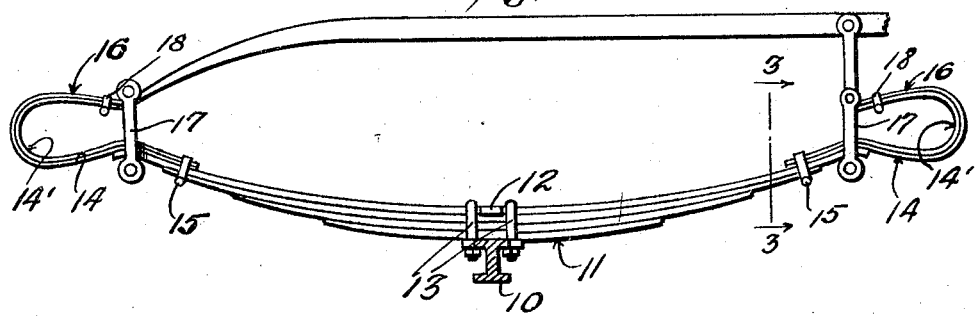
Figure 1 is an elevation of a vehicle spring made in accordance with the present invention.
Figure 2:
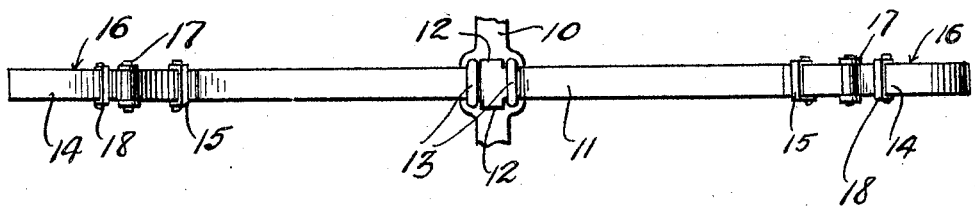
Figure 2 is a top plan view of the same.
Figure 3:
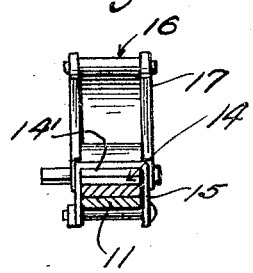
Figure 3 is a vertical transverse sectional view on the line 3—3 of Figure 2, showing the clips in elevation.

Referring particularly to the accompanying drawing, 10 represents a portion of a front axle, to which the spring is arranged to be secured. The main portion of the spring, as shown at 11, consists of a plurality of layers, the central portion of the uppermost of which has the opposite lateral lugs or ears 12, extending therefrom, and on each side of these ears is a U-clip which, as shown at 13, embraces the layers of the spring and have their legs disposed through openings in the flanges of the axle. By this arrangement the ordinary method of passing a bolt through the centers of the layers, with the consequent weakening of the spring, is obviated.

Secured to the outer ends of the uppermost layer of the main spring 11, are the auxiliary, or light load springs 14. Each of these springs 14 has its stem secured to the main spring by means of the clips 15, the remaining portion of the spring extending longitudinally away from the main spring and having its end bent upwardly and inwardly, as at 16, and being pivotally connected with the upper end of one of the shackles 17 and 17', which is engaged with the end of the main spring. The lower end of the shackle 17 is pivotally suspended from the chassis 10' by means of the links 11', while the lower end of the shackle 17' is pivotally connected to the front end of the horn 12'. The auxiliary spring 14 is preferably formed in layers, with the inner layer 14', terminating a short distance from the end of the outer layer, and secured to the said outer layer by means of the clip 18.

The force of a light load will cause the springs 14 to yield, without affecting the main spring, but when a heavy load is applied, the springs 14 will yield until they touch the ends of the heavy spring, when the said heavy spring will yield. The rebound will be taken up by the lighter end springs 14, thus effectively protecting the spring from breaking.

What is claimed is:

1. A vehicle spring comprising a main laminated spring portion, a shackle engaged beneath each end of the main spring, auxiliary spring portions secured to the ends of the main spring portion and having their ends directed upwardly and inwardly and connected with the said shackle.

2. A vehicle spring comprising a main spring, auxiliary springs each having one end secured to an end of the main spring and extended upwardly and inwardly over the main spring ends, and shackles connecting the upwardly and inwardly extending ends of the auxiliary springs and supportingly engaged beneath the ends of the main spring.

3. A vehicle spring including a main spring and auxiliary lighter springs secured to the outer ends of the main spring and being curved to extend upwardly and inwardly over the ends of the main spring, shackles connected to the inner ends of the auxiliary springs and extending downwardly below the main spring, and connections between the lower ends of the shackles engaged in supporting relation to the main spring ends.

4. A vehicle spring device including a semi-elliptic main spring, U-shaped springs having their lower ends clipped to the ends of the semi-elliptic spring and their upper ends disposed in spaced relation above the main spring, and transverse connections between the lower ends of the shackles and engaged in supporting relation beneath the ends of the main spring, said transverse connections being adapted to be connected to a vehicle frame.

In testimony whereof, I affix my signature in the presence of two witnesses.

GUSTAV R. SAHLSTROM.

Witnesses:
 ORAM MOORE,
 JOHN SCHULER.